United States Patent

[11] 3,570,341

[72] Inventor: Joseph L. Abbott, Jr., Elnora, N.Y.
[21] Appl. No.: 705,207
[22] Filed: Feb. 13, 1968
[45] Patented: Mar. 16, 1971
[73] Assignee: Packaging Industries, Inc., Hyannis, Mass.

[54] ROLLER DIECUTTING MACHINE OR THE LIKE
27 Claims, 7 Drawing Figs.

[52] U.S. Cl. .................................................. 83/55, 83/512, 83/527, 83/547, 83/648, 83/659, 100/210, 100/295
[51] Int. Cl. .................................................. B26d 1/02
[50] Field of Search ........................... 83/512, 510, 509, 284, 547, 540, 434, 539, 531, 533, 542, 659, 527, 648, 55; 100/210, 211, 295

[56] References Cited

UNITED STATES PATENTS

| | | | |
|---|---|---|---|
| 487,840 | 12/1892 | Kaufman | 83/510 |
| 2,121,003 | 6/1938 | Balfe | 83/510X |
| 2,772,736 | 12/1956 | Campbell | 83/510 |
| 3,213,737 | 10/1965 | Wright | 83/510X |
| 3,237,499 | 3/1966 | Lohrand et al. | 83/510 |
| 3,301,110 | 1/1967 | Stegner | 83/284UX |

FOREIGN PATENTS

| | | | |
|---|---|---|---|
| 1,001,590 | 8/1965 | Great Britain | |
| 1,446,370 | 6/1966 | France | |

Primary Examiner—Frank T. Yost
Attorney—Kenyon and Kenyon Reilly Carr & Chapin

ABSTRACT: The disclosure relates to a roller diecutting machine in which rollers are used to force a workpiece against the dies. The machine includes a plurality of rollers which roll along a surface of a wear plate, and force the wear plate against the workpiece overlying the cutting edges of the dies. Each successive roller is adapted to have a greater degree of engagement with the wear plate during the movement of the roller across the wear plate. As a result, each roller applies an incrementally increasing cutting force to the workpiece.

Patented March 16, 1971

INVENTOR.
JOSEPH L. ABBOTT, JR.
BY
Kenyon & Kenyon
ATTORNEYS

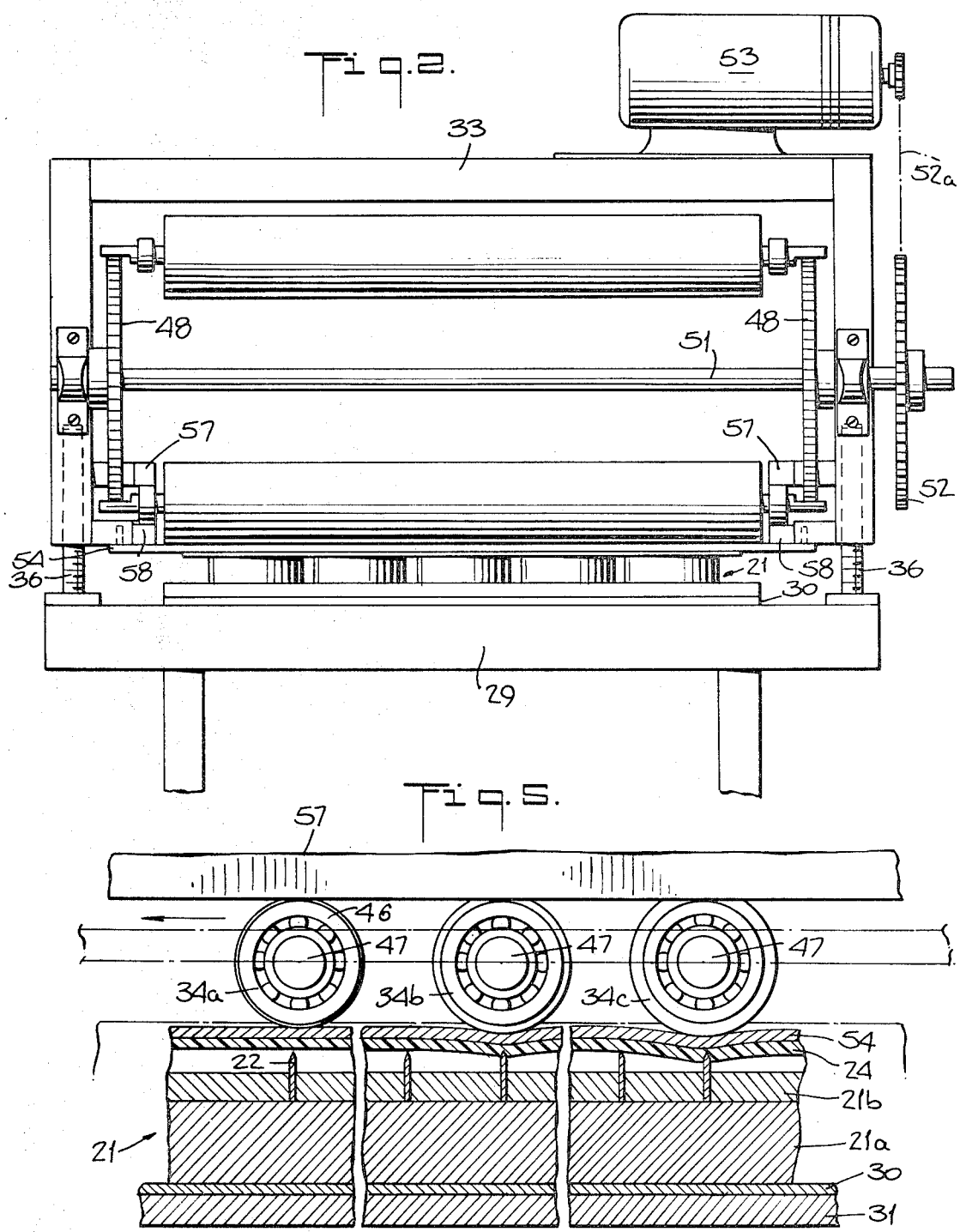

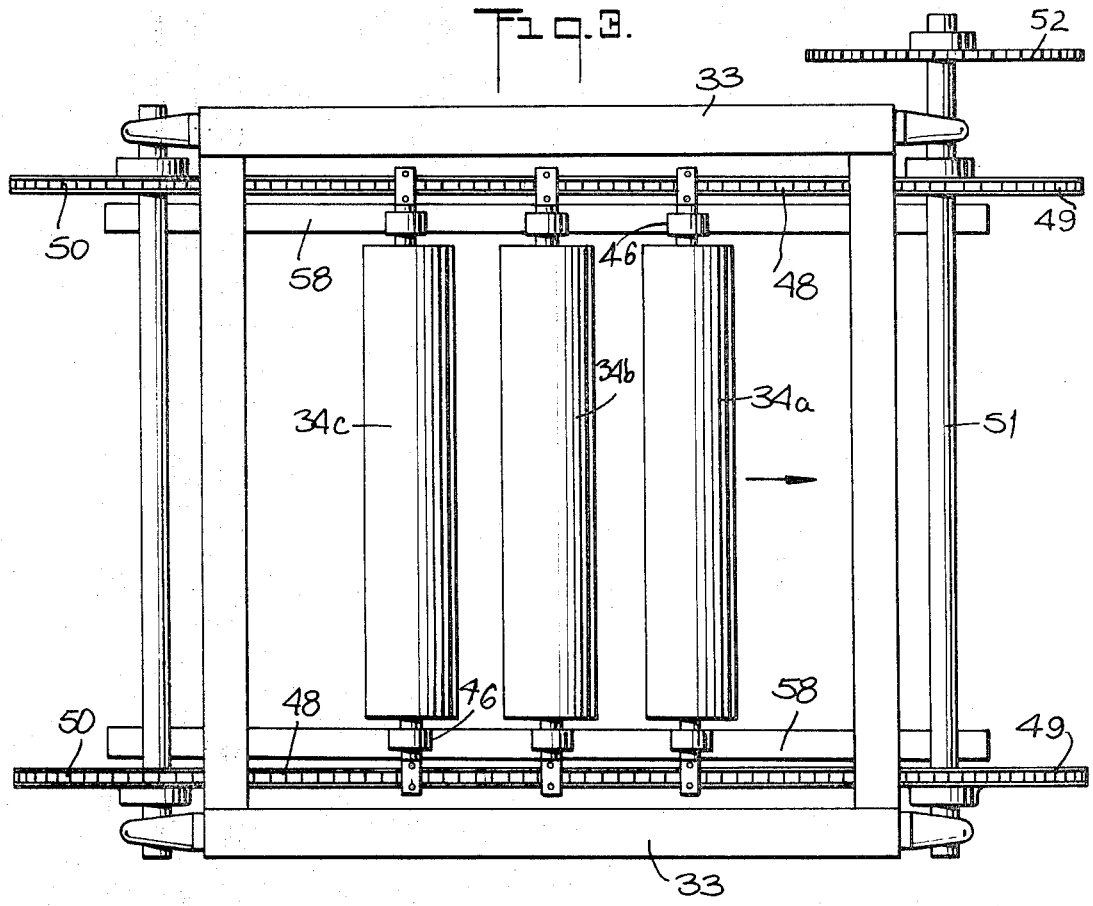
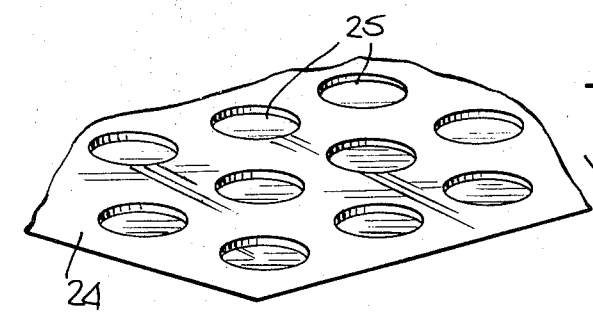
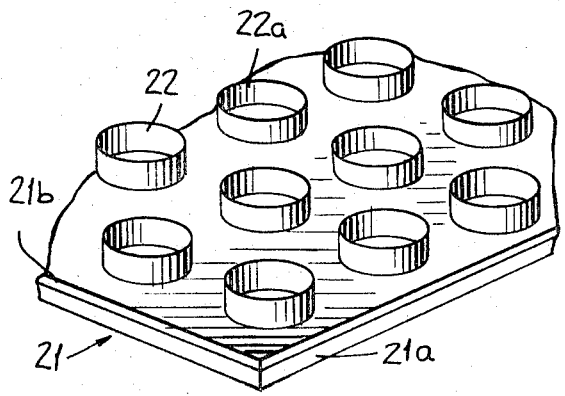

ROLLER DIECUTTING MACHINE OR THE LIKE

BACKGROUND OF THE INVENTION

The invention relates to roller diecutting machines and, in particular, to machines used to cut plastic blisters from a sheet of preformed blister packaging material.

In conventional roller diecutting machines, such as shown in U.S. Pat. No. 3,213,737, issued on Oct. 26, 1965, to David C. Wright, a workpiece which is placed between a cutting plate and a die is cut by a single pass of a roller across the cutting plate. The need to cut the workpiece completely through during a single pass of the roller places undue requirements upon the roller and the die. Thus the cutting is conventionally completed by a single pass of the roller regardless of the type or thickness of the material being cut. When the resistance presented by the workpiece to the roller force is greater than the roller force, the workpiece will not be completely cut by the roller movement. On the other hand, when that resistance of the workpiece to cutting is slightly less than the roller force, the cut made in the workpiece will have undesirable ragged edges.

SUMMARY OF THE INVENTION

It is an object of the invention to provide a novel roller diecutting machine.

It is another object of the invention to provide a roller diecutting machine which applies incrementally increasing roller forces to the workpiece being cut thereby enabling the workpiece to be cut progressively by each successive roller.

It is an additional object of the invention to provide a roller diecutting machine which applies incrementally increasing roller forces to the workpiece being cut in order to insure that the workpiece is cut with straight edges.

It is a further object of the invention to provide a roller diecutting machine for cutting one or more plastic blisters from a sheet of preformed blister packaging material.

In accordance with the invention, a roller diecutting machine includes a bed for supporting a cutting die which is adapted to receive a workpiece to be cut. The die which has cutting edges that define a cutting plane is mounted on a supporting bed. The machine further includes rollers with progressively increasing diameters for applying the incremental cutting forces to a workpiece positioned on the die.

Other objects of the invention and a fuller understanding of the invention are had by reference to the description of embodiments and the claims, taken in conjunction with the drawings.

BRIEF DESCRIPTION OF THE DRAWINGS

In the drawings:

FIG. 2 is an end elevation view of the machine shown in FIG. 1;

FIG. 3 is a plan view of the machine showing the plurality of rollers having outside diameters increasing in the direction of travel thereof;

FIG. 5 is a vertical section view showing the cutting rollers with progressively increasing diameters being advanced across the cutting die;

FIG. 6 is a fragmentary perspective view of the cutting die with a workpiece to be cut adjacent thereto; and FIG. 7 is a perspective view of one of the blisters after being cut from a sheet of blisters.

DESCRIPTION OF THE PREFERRED EMBODIMENTS

Figures 1, 4:
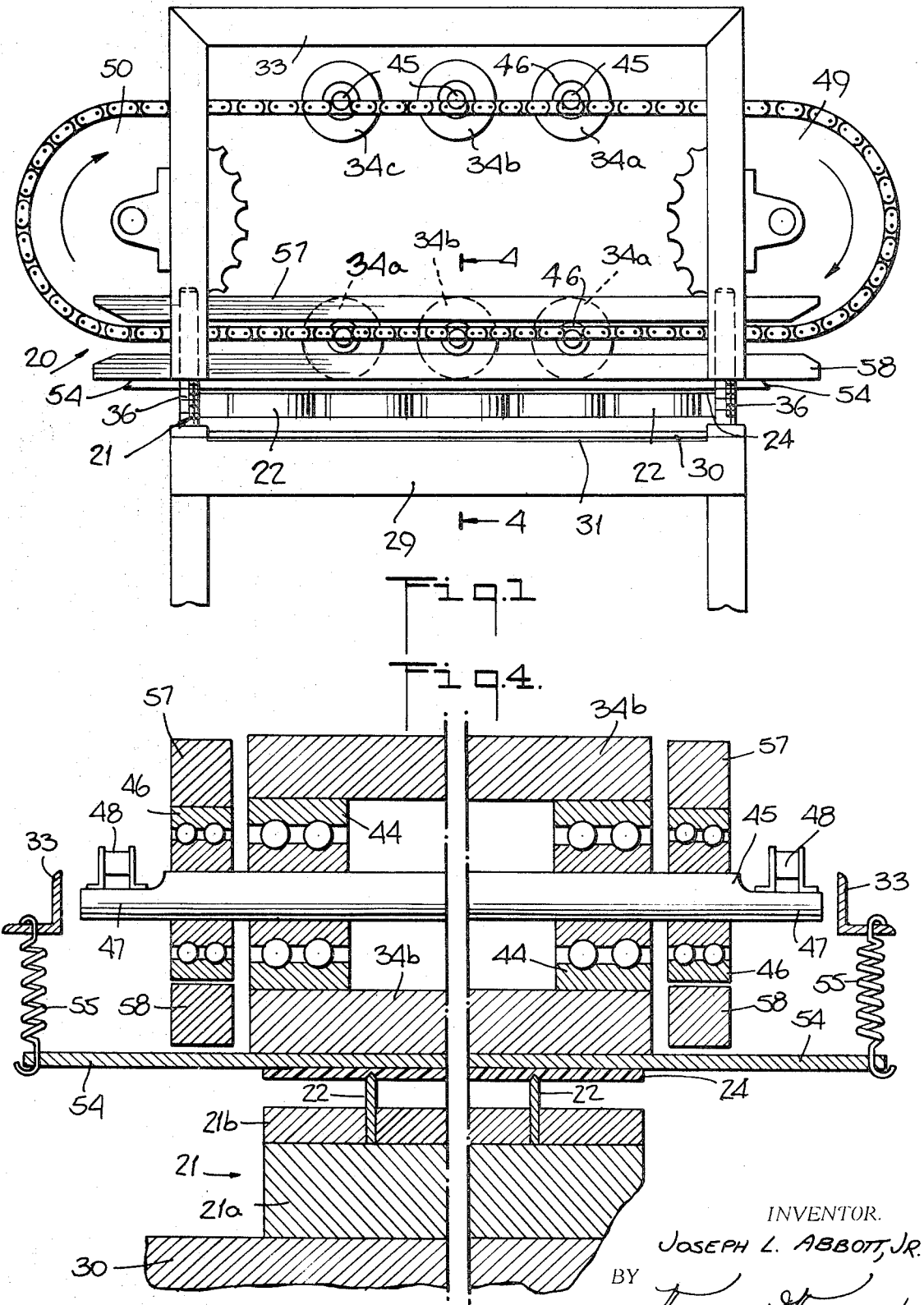
FIG. 1 is a side elevational view of a roller diecutting machine constructed in accordance with the invention.
FIG. 4 is a broken fragmentary vertical section view taken along line 4—4 in FIG. 1 and showing a roller, the wear plate suspended adjacent to the roller, the workpiece, and the cutting die.

The roller cutting die machine, constructed in accordance with the invention, can be used to cut sheets of paper, paperboard, rubber, leather, cloth, aluminum, steel, as well as sheets of plastic. A specific example of use is to cut plastic sheets (FIG. 6) containing a plurality of blisters 25 (FIG. 7) into individual blisters which are used in packaging a variety of products.

Referring to FIG. 1, a roller diecutting machine 20 constructed in accordance with the invention includes cutting die assembly 21 which is adapted to be positioned on plate or table 30 mounted upon bed 29. The cutting die assembly 21 includes a plurality of individual dies 22 mounted upon support 21a and extending through sheet 21b which serves to maintain the dies in position (FIG. 4).

The cutting die assembly 21 (FIG. 6) which can be in the form of one or more, such as steel rule, forged or other dies, includes a plurality of knife edges 22a formed from a plurality of hollow metal cylinders. Knife edges 22a can be used for the specific purpose of cutting blisters 25 from a web of plastic material which contains a plurality of blisters. The radius of the metal cylinders is larger than the radius of blisters 25 if blisters 25 are to have flange 26 (FIG. 7). It is to be understood, however, that other specific configurations of knife edge 22 can be used when other specific product shapes are desired.

As shown in FIG. 1, the cutting die assembly 21 which is adapted to receive a workpiece 24 to be cut can be positioned upon a plate 30 such as of flexible hard steel overlying bed 29. An additional force dampening means 31, such as a sheet of hard elastomeric material, for example, butyl rubber, thermoprene, or phenolaldehyde rubber mixtures, can be sandwiched between the top of plate or table 30 and bed 29.

FIG. 4 shows wear plate 54 disposed above workpiece 24 which is placed across dies 22. The cutting die assembly 21 is shown disposed upon plate or table 30. In operation, the rollers press wear plate 54 downwardly and sever the blisters from the web along the lower surface of the wear plate.

Cutting is accomplished by passing rollers 34a—c across wear plate 54 overlying workpiece 24 positioned on die assembly 21 (FIGS. 1 and 5). Rollers 34a—c have incrementally increasing outside diameters with roller 34a having the smallest diameter. The rollers as a result of their increasing diameters urge the wear plate toward the die assembly with incrementally increasing force so that the dies 22 progressively cut the workpiece.

In order to accommodate dies 22 of different heights, the height of the upper frame 33 of the machine including the path of travel of the rollers is adjustable with respect to the table 30. Referring to FIG. 1, jackscrews 36 enable upper frame 33 to be raised or lowered and at the same time made level with respect to bed 29. The jackscrews enable the degree of engagement between rollers 34a—c and cutting edges 22a of the dies to be determined. The degree of engagement is so determined whether the rollers act through wear plate 54 or act directly on the plurality of dies 22.

The particular superstructure 33 shown in FIG. 1 includes three rollers, 34l, 34b, 34c. Each roller (FIG. 4) is mounted on bearings 44 which are supported by shafts 45; a second set of bearing 46 is mounted intermediate roller bearings 44 and the elongated flattened shaft ends 47 and the roller. The shaft ends 47 are attached to endless chains 48 which are driven by driving sprockets 49 and supported by driven sprockets 50 (FIG. 1). Sprockets 49 are mounted on a shaft 51 which is connected through sprocket 52 and chain 52a to motor 53 (FIG. 3).

A wear plate 54 (FIG. 4) is suspended by tension springs from the superstructure 33. The wear plate 54 lies in a plane between the rollers and the bed 29. The wear plate is suspended by the springs slightly above the plane of the cutting edges of the dies. In this way, a clearance is provided between the lower surface of the wear plate and the dies in order that the dies can be moved in and out beneath the wear plate. When the rollers advance and contact the wear plate, the wear plate is forced against the restraint of the suspending springs and toward the dies. Following the passage of the rollers across the wear plate, the springs elevate the wear plate to its rest position.

Furthermore, the wear plate 54 can comprise a sheet of soft steel or treated aluminum; the softer metal does not blunt the cutting edges of the die when that sheet engages the die during the cutting operation.

In operation of the machine 20 thus far described, the cutting die assembly 21 is positioned on the plate or table 30 with a workpiece 24 disposed upon the die (FIG. 5). Superstructure 33 including rollers 34a—c are adjusted to determine the degree of engagement of the rollers with the wear plate or directly with the cutting edges of the dies. Motor 53 (FIG. 2) is then energized to drive chains 48, thereby driving rollers 34a, 34b and 34c (FIG. 5) across wear plate 54. During this time bearings 46 roll between rails 57 and 58 in the arrangement shown in FIG. 4. When an upward reactive force is applied to the rollers by the wear plate, the bearings are urged to roll against rail 57; however, since each of the rollers is provided with a successively larger diameter, the surface of each roller travels in a different horizontal plane. Therefore, each successive roller causes the wear plate to descend into a different horizontal plane with respect to the die. In this way each roller applies an incrementally increasing force through the wear plate 54 to the workpiece 24 to be cut. A complete cut can be made on one pass of the plurality of rollers. If necessary, successive passes can be used to cut thicker material.

It is to be understood that, although the specific examples of a means for applying incrementally increasing roller forces to the workpiece 24 to be cut have included three cutting rollers, incremental cutting can be accomplished with a pair of rollers. Thus two cutting rollers can be used when it is necessary to develop only one incremental change in roller cutting force magnitude for each movement of the rollers across the wear plate. The use of more than three rollers enables smaller increments in roller cutting force magnitude to be developed. In addition, wear plate 54 can be omitted to allow the rollers directly to engage the workpiece.

Thus it can be seen that the roller die cutter of the invention, by virtue of the progressive application of different forces to the wear plate by each of the rollers, enables incremental cutting of the work piece to be accomplished in one swift pass of the roller assembly over the roller dies. Thus the unique incremental cutting procedures of the invention eliminate difficulties related to the peripheral length of the roller dies' cutting edges and in addition it minimizes the requirements of "make ready.".

More than one series of rollers 34a—c can be used. Additional cutting pressure may be applied selectively or uniformly by continuing to lower the jackscrews. When resilient plate 31 (FIG. 1) is used between plate 30 and bed 29 the plate can be compressed in order to permit the use of nonparallel dies and/or the cutting of heavy gauge material.

In addition, the concept of progressive application of different forces to the wear plate can be employed, not only in a roller cutting machine, but also in a machine that makes laminated structures, and in a machine that embosses a variety of materials, as well as a die punch or pressing machine in which the wear plate serves as a male die and the bed serves as a female die.

As the load supporting bearings 46 or shafts 45 of the rollers 34a—c make contact with rails 57 (FIG. 4), wear plate 54 is depressed downward until it is in intimate contact with workpiece 24 to be cut. The series of cutting rollers traveling with respect to rails 57 impart increasing forces incrementally through the wear plate to the material and the cutting edges 22a of the dies. The number of increasing forces and their differences in magnitude are a function of the number of rollers and the increase in diameter of each following roller.

After the passage of a series of rollers and their return to the upper reaches of chain 48, the wear plate is elevated by springs 55, thereby facilitating the removal of die assembly 21 from beneath the wear plate. At this point motor 53 is deenergized and the cycle is completed. Once the blisters are removed from the dies and the punched web disposed of, a new workpiece can be placed over the dies. The die assembly with the workpiece is then advanced beneath the wear plate and a new cutting cycle begins.

It is to be further understood that although specific embodiments of the invention have been described and shown, variations in structural detail within the scope of the appended claims are possible and are contemplated. There is no intention, therefore, of limitation to the exact abstract or disclosure herein presented.

I claim:

1. A machine for applying force to a surface of a workpiece comprising:
   a. means for supporting a workpiece with the surface disposed in a predetermined plane;
   b. a plurality of roller means disposed substantially parallel to one another for incrementally increasing the force to be applied by each successive roller means to the surface of the workpiece when said plurality of roller means are rolled with respect to the surface of the workpiece, each of said plurality of roller means having a larger diameter than the roller disposed in advance thereof;
   c. means extending substantially parallel to said predetermined plane and in rolling contact with the portion of each of said plurality of roller means opposite said supporting means for applying force to the roller means in a direction corresponding to the force applied to the workpiece and for directing the axis of rotation of each of said plurality of roller means to travel in a substantially common plane parallel to the predetermined plane of the surface of said workpiece, whereby the engagement of each of said plurality of roller means with respect to the workpiece when disposed on said supporting means can be incrementally increased; and
   d. means for rolling said plurality of roller means with respect to a workpiece disposed upon said supporting means.

2. A machine in accordance with claim 1 in which said plurality of roller means includes bearing means connected to each of said plurality of rollers and said means in engagement with said roller means is in engagement with said bearing means.

3. A machine in accordance with claim 2 in which:
   a. said bearing means connected to each of said plurality of rollers are disposed at each of the opposite ends of each of said rollers and each have a circular outer surface disposed concentrically with respect to the axis of rotation of the roller related thereto; and
   b. said means in engagement with said bearing means of said plurality of rollers for directing the axis of rotation of said plurality of rollers to travel in a substantially common path comprise tracks spaced apart substantially parallel with respect to one another and extending substantially parallel to said supporting means and in engagement with the portion of the circular outer surface of said bearing means disposed opposite said supporting means, whereby said bearing means when rolling on said tracks is forced with said rollers by said tracks toward said supporting means and the workpiece thereon.

4. A machine in accordance with claim 1 in which said plurality of roller means are grouped in sets and in which said machine includes a plurality of said sets of roller means.

5. A machine in accordance with claim 1 and further comprising means for adjustably positioning the path of rolling of said plurality of roller means with respect to the workpiece positioned upon said supporting means.

6. A machine in accordance with claim 5 in which said means for adjustably positioning the path of rolling of said roller means with respect to a workpiece positioned upon said supporting means comprises a plurality of screw means for mounting said roller means with respect to said means for supporting a workpiece.

7. A machine in accordance with claim 6 in which each of said plurality of screw means comprises a jackscrew.

8. A machine in accordance with claim 1 in which said means for rolling said plurality of roller means with respect to a workpiece positioned upon said supporting means comprises an endless conveyor.

9. A machine in accordance with claim 8 in which said endless conveyor comprises a pair of drive chains extending along paths disposed in spaced-apart and substantially parallel planes, said roller means extending between said pair of drive chains and being coupled thereto, one reach of each of said pair of drive chains being disposed adjacent to said supporting means.

10. A machine in accordance with claim 1 and further comprising a wear plate adapted to be disposed between said roller means and a workpiece when positioned upon said supporting means, said wear plate being adapted to be engaged with said rollers to transmit the force of said rollers to the workpiece.

11. A machine in accordance with claim 10 and further comprising means for resiliently supporting said wear plate with respect to the frame of the machine to enable the wear plate to be moved into contact with a workpiece positioned upon said supporting means when said wear plate is engaged by said roller means.

12. A machine in accordance with claim 11 in which said means for resiliently supporting said wear plate with respect to the frame of the machine comprises a plurality of tension springs connected between said wear plate and the frame of the machine.

13. A machine in accordance with claim 1 in which said means for supporting a workpiece comprises:
 a. a base surface;
 b. a sheet of resilient material overlying said base surface; and
 c. a table member disposed upon said sheet of resilient material, said table member facing said plurality of roller means.

14. A machine in accordance with claim 13 in which said sheet of resilient material is formed of elastomeric material.

15. A machine in accordance with claim 13 in which said table member comprises a plate of flexible material.

16. A machine in accordance with claim 1 and further comprising at least one cutting die adapted to be disposed upon said means for supporting a workpiece in a facing relationship with said plurality of roller means, said plurality of roller means being adapted to urge a workpiece against said cutting during the rolling of said plurality of roller means with respect to the work piece.

17. A machine in accordance with claim 16 and further comprising a wear plate disposed between said plurality of roller means and said cutting die, when a workpiece is positioned upon said cutting die, said wear plate being adapted to transmit the force of said roller means to the workpiece to urge the workpiece against said cutting die.

18. A machine in accordance with claim 17 in which said wear plate is formed from soft material at least on the side thereof facing said cutting die, the soft material preventing wear to said cutting die when in contact therewith.

19. A roller diecutting machine comprising:
 a. a cutting die having exposed knife edges disposed substantially in a common cutting plane;
 b. a plurality of rollers, said rollers having progressively increasing outside diameters;
 c. means for advancing said plurality of rollers; and
 d. means extending substantially parallel to said common cutting plane and in rolling contact with the portion of each of said plurality of rollers opposite said cutting die for applying force to the rollers in a direction corresponding to the force applied to a workpiece and for controlling the advancement of said rollers to maintain the rotational axes thereof being advanced sequentially along a plane parallel to the common cutting plane, said plurality of rollers being advanced with said roller of smaller diameter being in the leading position; whereby the outside diameters of said rollers incrementally decrease the distance between said rollers and the cutting plane and thereby incrementally increase the force applied to a workpiece when positioned upon said cutting die.

20. A roller diecutting machine according to claim 19 wherein said means for advancing said plurality of rollers includes a pair of spaced-apart continuous chains to which the respective ends of each roller in said plurality of rollers are fastened.

21. A roller die-cutting machine in accordance with claim 19 and further comprising a wear plate positioned between said die and said rollers; the advancing of said rollers by said means for advancing said rollers along a plane parallel to the cutting plane forcing said wear plate against the work piece.

22. A roller diecutting machine in accordance with claim 19 and further comprising means for adjusting the separation between the plane of said cutting die and the plane through which the rotational axis of said plurality of rollers are advanced, whereby the degree of separation between said plurality of roller means and said cutting die can be selected.

23. A roller diecutting machine adapted for use with a cutting die having exposed knife edges comprising:
 a. a machine superstructure;
 b. means for supporting the cutting die relative to said superstructure;
 c. a wear plate;
 d. spring means for suspending said wear plate from the superstructure;
 e. means movably mounted on the superstructure for applying incrementally increasing cutting forces through said wear plate to a workpiece when positioned on the knife edges, said force applying means including;
  i. a pressure bar,
  ii. first, second and the third rollers adapted to advance sequentially along said wear plate, the outside diameter of said rollers increasing from said first to said third roller,
  iii. bearing means rotatably mounted at the end of each roller for movement on said pressure bar when said rollers urge said wear plate against a workpiece when positioned on the cutting die as said rollers move across said wear plate, said pressure bar, said rollers and said bearing means during each sequential advance of said rollers across the wear plate causing the cutting force developed by said third roller to be incrementally larger than the cutting force developed by said second roller and the cutting force developed by the latter to be incrementally larger than the cutting force developed by said first roller.

24. A method of applying forces to a workpiece that comprises the steps of:
 a. positioning the workpiece on a support with the surface of the workpiece opposite the support extending in a horizontal plane;
 b. moving a plurality of rollers in which successive rollers have increasingly larger diameters in a rolling motion with respect to the workpiece to engage a substantial area of the surface of the workpiece; and
 c. increasing the degree of engagement of each successive roller with respect to the surface of the workpiece during a movement of the rollers with respect to the workpiece by engaging each of the rollers with means extending substantially parallel to the horizontal plane to apply force to the plurality of rollers in a direction corresponding to the force applied to the workpiece and to maintain the axes of rotation of the plurality of rollers substantially in a common plane parallel to that of the surface of the workpiece as the plurality of rollers are moved in a rolling motion with respect to the workpiece.

25. A method of applying force to a workpiece in accordance with claim 24 in which the step of moving a plurality of rollers in a rolling motion with respect to the workpiece comprises the placing of a wear plate between the plurality of rollers and the workpiece and rolling the plurality of rollers along the surface of the wear plate to apply incrementally increasing force to the workpiece.

26. A method of applying cutting forces to a workpiece that comprises the steps of:
   a. positioning the workpiece with a surface thereof extending in a predetermined plane and in a cutting relationship with respect to a cutting die;
   b. moving a plurality of rollers in which successive rollers have increasingly larger diameters in a rolling motion with respect to the surface of the workpiece; and
   c. increasing the degree of engagement of each successive roller with respect to the surface of the workpiece during movement of the roller with respect to the cutting die by engaging each of the rollers on the portion opposite the cutting die with means extending substantially parallel to the predetermined plane of the surface of the workpiece to apply force to the plurality of rollers in a direction corresponding to the force applied to the workpiece and to maintain the axes of rotation of the plurality of rollers substantially in the predetermined plane as the plurality of rollers are moved in a rolling motion with respect to the cutting die.

27. A method of applying cutting force to a workpiece in accordance with claim 26 in which the step of moving a plurality of rollers in a rolling motion with respect to the cutting die comprises the placing of a wear plate between the plurality of rollers and the workpiece and the rolling of the plurality of rollers along the surface of the wear plate to apply incrementally increasing cutting force through the cutting die to the workpiece.